United States Patent
Zioulas et al.

(10) Patent No.: US 7,593,351 B1
(45) Date of Patent: Sep. 22, 2009

(54) METHOD AND SYSTEM FOR COLLECTING AND CONSOLIDATING NETWORK TRAFFIC INFORMATION

(75) Inventors: George Zioulas, Sunnyvale, CA (US); Wenjie Ding, Fremont, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 879 days.

(21) Appl. No.: 11/173,758

(22) Filed: Jun. 30, 2005

(51) Int. Cl.
*H04J 3/14* (2006.01)
*G06F 7/36* (2006.01)
*G06F 11/30* (2006.01)

(52) U.S. Cl. .................. 370/255; 370/252; 340/3.2; 709/224; 715/736

(58) Field of Classification Search ............... 370/241, 370/248–252, 254, 255; 709/223, 224; 340/3.1, 340/3.2; 715/736
See application file for complete search history.

(56) References Cited

U.S. PATENT DOCUMENTS

| | | | | |
|---|---|---|---|---|
| 5,854,889 | A * | 12/1998 | Liese et al. | 714/43 |
| 6,108,782 | A * | 8/2000 | Fletcher et al. | 713/153 |
| 6,148,337 | A * | 11/2000 | Estberg et al. | 709/224 |
| 6,397,359 | B1 * | 5/2002 | Chandra et al. | 714/712 |
| 6,584,502 | B1 * | 6/2003 | Natarajan et al. | 709/224 |
| 6,674,724 | B1 * | 1/2004 | Main et al. | 370/241 |
| 6,711,137 | B1 * | 3/2004 | Klassen et al. | 370/252 |
| 6,819,655 | B1 * | 11/2004 | Gregson | 370/242 |
| 6,970,924 | B1 * | 11/2005 | Chu et al. | 709/224 |
| 6,973,491 | B1 * | 12/2005 | Staveley et al. | 709/224 |
| 2002/0052950 | A1 * | 5/2002 | Pillai et al. | 709/224 |
| 2006/0253566 | A1 * | 11/2006 | Stassinopoulos et al. | 709/224 |

* cited by examiner

*Primary Examiner*—Chi H Pham
*Assistant Examiner*—Ahmed Elallam
(74) *Attorney, Agent, or Firm*—Robert M. McDermott, Esq.

(57) ABSTRACT

A distributed network monitoring system includes a central monitoring device configured to fetch network traffic information from one or more remote monitoring devices in response to receiving a notification from the remote monitoring devices that the network traffic information is available, the remote monitoring devices being communicatively coupled to the central monitoring device. The network traffic information is associated with a timestamp which indicates a time period at which the network traffic information was collected by the remote monitoring devices. The central monitoring device further synchronizes the network traffic information from the remote monitoring devices by comparing the timestamp of the network traffic information with a system timestamp provided by a system clock or network time protocol (NTP) server. The network traffic information is identified as unavailable if the timestamp cannot be located when compared to the system timestamp. In addition, the central monitoring device starts a timeout wait period for the remote monitoring device with the unavailable network traffic information and further ceases collecting the network traffic information if the timeout wait period expires. The synchronized network traffic information is further consolidated to provide information regarding the overall performance of a network system.

21 Claims, 7 Drawing Sheets

| TIMESTAMP | APPLIANCE 14 | APPLIANCE 18 | DIRECTOR 22 |
| --- | --- | --- | --- |
| T1-T4 | Collect network data | Collect network data | |
| T5 | Collect network data<br>Notify director<br>Notification successful | Collect network data<br>Notify director<br>Notification successful | Receive Note_A14_T1_T5<br>Receive Note_A18_T1_T5<br>Fetch data from A14 and A18<br>Aggregate data for T1_T5 |

FIGURE 4a

| TIMESTAMP | APPLIANCE 14 | APPLIANCE 18 | DIRECTOR 22 |
| --- | --- | --- | --- |
| T6-T9 | Collect network data | Collect network data | |
| T10 | Collect network data | Collect network data<br>Notify director<br>Notification successful | Receive Note_A18_T6_T10<br>Fail to receive Note_A14_T6_T10<br>Fetch data from A18<br>Buffer data A18<br>Start timeout wait for A14 |
| T11 | Notify director<br>Notification successful<br>Collect network data | Collect network data | Receive Note_A14_T6_T10<br>Reset timeout<br>Fetch data A14<br>Aggregate data for T6_T10 |

FIGURE 4b

| TIMESTAMP | APPLIANCE 14 | APPLIANCE 18 | DIRECTOR 22 |
|---|---|---|---|
| T12-T14 | Collect network data | Collect network data | |
| T15 | Collect network data<br><br>Notify director<br><br>Notification Unsuccessful | Collect network data<br><br>Notify director<br><br>Notification Successful | Receive Note_A18_T11_T15<br><br>Fail to receive Note_A14_T11_T15<br><br>Fetch data A18_T11_T15<br><br>Buffer data A18_T11_T15<br><br>Start timeout wait for A14 |
| T16-T19 | Collect network data | Collect network data | |
| T20 | Collect network data<br><br>Notify director<br><br>Notification Successful | Collect network data<br><br>Notify director<br><br>Notification Successful | Receive Note_A14_T11_T20<br><br>Receive Note_A18_T16_T20<br><br>Reset timeout<br><br>Fetch data A14_T11_T20<br><br>Fetch data A18_T16_T20<br><br>Aggregate data for T11_T20 |

FIGURE 4c

| TIMESTAMP | APPLIANCE 14 | APPLIANCE 18 | DIRECTOR 22 |
|---|---|---|---|
| T21-T24 | Collect network data | Collect network data | |
| T25 | Collect network data<br><br>Notify director<br><br>Notification Unsuccessful | Collect network data<br><br>Notify director<br><br>Notification Successful | Receive Note_A18_T21_T25<br><br>Fail to receive Note_A14_T21_T25<br><br>Fetch data A18_T21_T25<br><br>Buffer data A18_T21_T25<br><br>Start timeout wait for A14 |
| T26-T29 | Collect network data | Collect network data | |
| T30 | Collect network data<br><br>Notify director<br><br>Notification Unsuccessful | Collect network data<br><br>Notify director<br><br>Notification Successful | Receive Note_A18_T26_T30<br><br>Fail to receive Note_A14_T21_T30<br><br>Fetch data A18_T26_T30<br><br>Buffer data A18_T26_T30<br><br>Timeout wait for A14 expired<br><br>Mark data for T21_T30 as incomplete |
| T31-T34 | Collect network data | Collect network data | |
| T35 | Collect network data<br><br>Notify director<br><br>Notification Successful | Collect network data<br><br>Notify director<br><br>Notification Successful | Receive Note_A14_T31_T35<br><br>Receive Note_A18_T31_T35<br><br>Fetch data A14_T31_T35<br><br>Fetch data A18_T31_T35<br><br>Aggregate data for T31_T35 |

FIGURE 4d

METHOD AND SYSTEM FOR COLLECTING AND CONSOLIDATING NETWORK TRAFFIC INFORMATION

FIELD OF THE INVENTION

The present invention relates to a method and a system for collecting network traffic information from a distributed system of monitoring devices. The network traffic information is further synchronized and consolidated to provide information regarding the overall performance of a network system.

BACKGROUND

Today, information technology professionals often encounter myriad different problems and challenges during the operation of a computer network or network of networks. For example, these individuals must often cope with network device failures and/or software application errors brought about by causes such as configuration errors. In order to permit network operators and managers to track down the sources of such problems, network monitoring devices capable of recording and logging vast amounts of information concerning network communications have been developed.

Conventional network monitoring devices, however, suffer from scalability problems. For example, because of finite storage space associated with such devices, conventional network monitoring devices may not be able to monitor all of the nodes or communication links associated with large enterprise networks or networks of networks. For this reason, such network monitoring devices may need to be deployed in a network of their own, with lower level monitoring devices reporting up to higher level monitoring devices.

In such a network of monitoring devices it is important to allow for synchronizing and consolidating the network traffic information to provide information regarding the overall network performance. The present invention addresses such needs.

SUMMARY OF THE INVENTION

A distributed network monitoring system configured in accordance with one embodiment of the present invention includes a central monitoring device configured to fetch network traffic information from one or more remote monitoring devices in response to receiving a notification from the remote monitoring devices that the network traffic information is available, such remote monitoring devices being communicatively coupled to the central monitoring device. The network traffic information may be associated with a timestamp which indicates a time period at which the network traffic information was collected by the remote monitoring devices. The central monitoring device further synchronizes the network traffic information from the remote monitoring devices by comparing the timestamp of the network traffic information with a system timestamp provided by system clock or network time protocol (NTP) server. The network traffic information may be identified as unavailable if the timestamp cannot be located when compared to the system timestamp. In addition, the central monitoring device may start a timeout wait period for the remote monitoring device with the unavailable network traffic information and further cease collecting the network traffic information if the timeout wait period expires. The synchronized network traffic information may be further consolidated to provide information regarding the overall performance of a network system.

BRIEF DESCRIPTION OF THE DRAWINGS

The present invention is illustrated by way of example, and not limitation, in the figures of the accompanying drawings in which.

DETAILED DESCRIPTION

Described herein is a method and a distributed network monitoring system adapted for monitoring one or more computer networks or networks of networks. Although discussed with respect to various illustrated embodiments, the present invention is not limited thereby. Instead, the illustrations are provided to highlight various features of the present invention. The invention itself should be measured only in terms of the claims following this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

Figure 1:
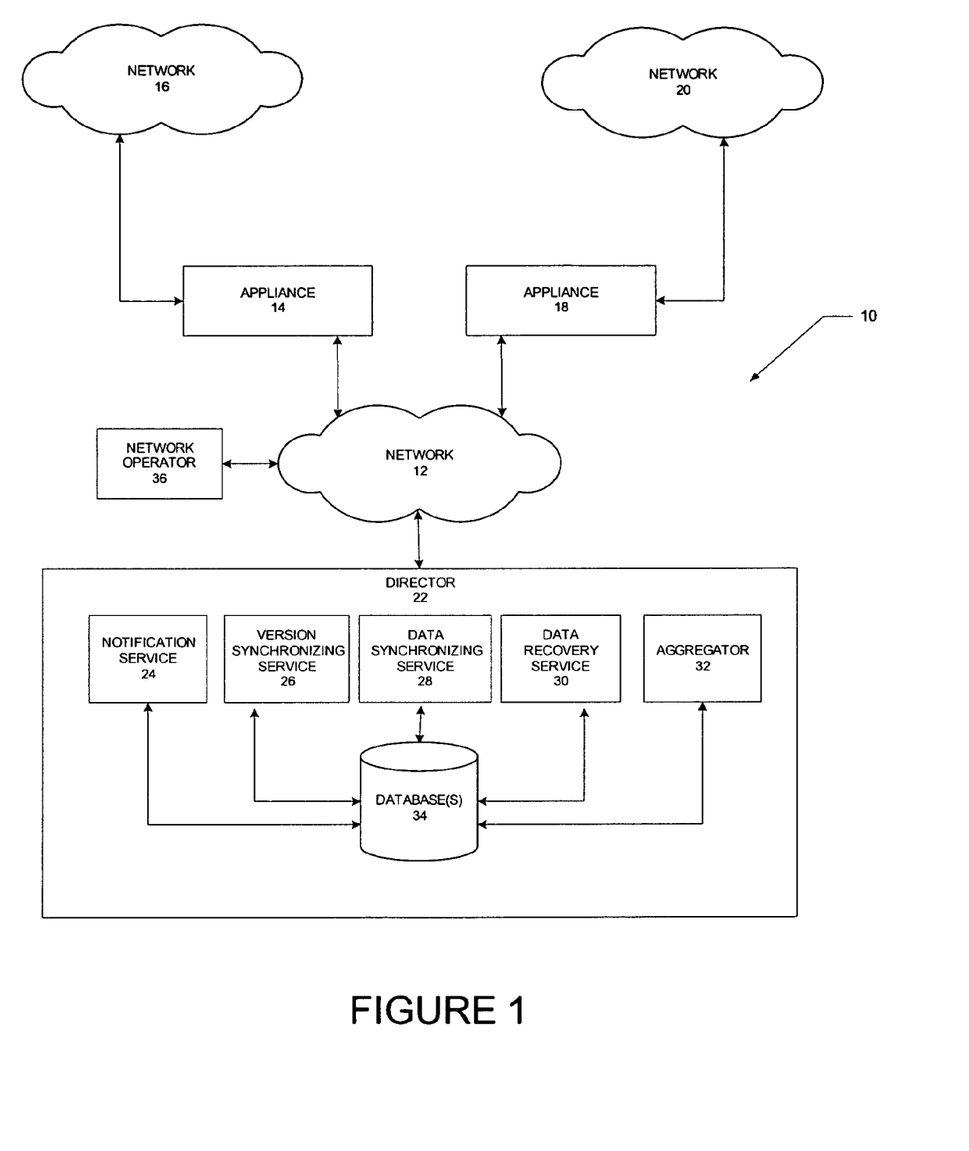
FIG. 1 illustrates an example of network monitoring devices deployed in accordance with an embodiment of the present invention so as to monitor traffic to and from various network nodes arranged in logical groupings.

FIG. 1 is a network diagram depicting a computer network 10 including multiple networks 12, 16 and 20. The networks 12, 16 and 20 may be a single network or a network of networks. In addition, the networks 12, 16 and 20 may represent logical groupings. For example, the logical groupings may mirror business groups, or may designate computers performing similar functions, computers located within the same building, or any other aspect that a user or network operator/manager wishes to highlight.

For a network of any appreciable size, such as that shown in FIG. 1, a single network monitoring device may not be suffice to collect and store network traffic data for all nodes and communication links of interest. Thus, the present invention provides multiple network monitoring devices to be deployed so that a network operator/manager can be certain that data for all nodes/links of interest is collected. To permit ease of management and centralized control, the present invention further allows the network operator to deploy such network monitoring devices in a network of their own, thus forming a distributed network monitoring system.

As illustrated in FIG. 1, a central network monitoring device 22 (hereinafter termed the Director) receives network traffic information from two individual network monitoring devices 14, 18 (each hereinafter referred to as an Appliance) via network 12. Appliance 14 is responsible for collecting network traffic information associated with the remote network 16. Appliance 18 is responsible for collecting network traffic information associated with the remote network 20. Network traffic information collected by the Appliances 14, 18 may be reported to the Director 22 for local storage, synchronization and aggregation which are described further below.

In one example, remote networks 16 and 18 may each include multiple nodes, interconnected with one another and/or with nodes in the other respective network by a myriad of communication links, which may include direct communication links or indirect communication links (e.g., which traverse other networks not shown in this illustration). Thus, the total number of monitored nodes/links may be quite large, such that no single monitoring device could store and/or process all of the network traffic information being collected.

Each of the Appliances 14, 18 may be responsible for collecting network traffic information concerning multiple groupings of nodes in their associated networks 16 and 20. That is, the network operator 36 may, for convenience, define multiple logical and/or physical groupings of nodes in each of the networks 16 and 20 and configure the respective Appliances 14, 18 to store and track network traffic information accordingly. Alternatively, local network operators may separately configure each of the local Appliances 14, 18 in accordance with their needs.

The Appliances 14, 18 may be located anywhere that allows for the collection of network traffic information of the associated networks 16 and 20. Similarly, the Director 22 may be located anywhere that allows for the collection of network traffic information from the Appliances 14, 18. Although FIG. 1 illustrates that the Director 22 is located at a different network segment from Appliances 14, 18, it is not necessarily so. For example, the Director 22 may be located at the same network 16 as the Appliance 14.

The Appliances 14, 18 can be a passive monitoring device, e.g., spanning a switch or router (span or tap), whereby all the traffic is copied to a switch span port which passes traffic to Appliances 14, 18. In addition, the Appliances 14, 18 can also use passive optical taps to receive a copy of all traffic.

The Director 22 includes several modules of interest in connection with the present invention. As indicated above, these modules may be implemented in computer software for execution by a computer processor in accordance with the instructions embodied therein. The processor itself may be part of a conventional computer system, including read and write memory, input/output ports and similar features. The modules are: a notification service 24, a version synchronizing service 26, a data synchronizing service 28, a data recovery service 30, an aggregator 32 and a database 34. In some cases, two or more of these modules may be combined in a single module, or a single module may be subdivided into multiple sub-modules. The number of modules is not critical to the present invention.

The notification service 24 receives Appliance-initiated indications that the network traffic information is ready to be collected from the Appliance. The Appliances, 14, 18 may be configured to provide the indications according to performance metrics, such as average delay from the Appliances 14, 18 to the Director 22, loads on the Appliances 14, 18 or the Director 22, and reliability of a path from the Appliances 14, 18 to the Director 22 and available bandwidth of the path. When the notification service 24 receives the Appliance-initiated indications, the notification service 24 instructs the Director 22 to fetch the network traffic information from the Appliances.

In one embodiment, the Appliances 14, 18 may pre-notify the notification service 24 of the time interval that the indications will be sent. For example, if the Appliance 14 sends its indications at a 30 minutes interval, the notification service 24 is configured to listen for such indication at timestamps 30, 60, 90 and so on. Therefore, if the notification service 24 fails to receive an indication from the Appliance at an expected time, the notification service 24 may inform the Director 22 that a failure has occurred with the Appliance. This enables the Director 22 to take appropriate actions, such as performing a data recovery operation. As such, the notification service 24 is configured to notify the data recovery service 30 and the data synchronizing service 28 if the Appliance-initiated indication is unavailable.

One advantage afforded by the present invention is the ability of a network operator 36 to consolidate the network traffic information of Appliances 14, 18 regardless of the version or format of the network traffic information that is submitted. In a large distributed system, there may be multiple Appliances at different software version levels across the network. The Director 22 is configured to recognize differences between network traffic information/formats across different Appliances and to synchronize them accordingly. In particular, the Director 22 is able to interpret the current version of the Appliance and then construct/format the data version. This is achieved through the version synchronizing service 26 which translates the data format of the network traffic information to a normalized data version. The normalized data version may be according to a version of one of the Appliances 14, 18 or a version of the Director 22. In one embodiment of the present invention, the Appliance-initiated indication provides the data version information. The notification service 24 forwards this information to the version synchronizing service 26. Based on this information, the version synchronizing service 26 formats the data accordingly when the Director 22 fetches the network traffic information from the Appliances.

Among other things, the present invention enables the Appliances 14, 18 to have the flexibility of providing the Director 22 with the network traffic information at a same or a different time. Therefore, the network traffic information from the Appliances 14, 18 has to be synchronized before the information can be further consolidated or analyzed. The data synchronizing service 28 synchronizes the network information from the Appliances 14, 18 according to a NTP (Network Time Protocol) server, or alternatively, with the Director 22 which clock is already synchronized with the NTP server. Basically, the data synchronizing service 28 compares the network information from each Appliance with the NTP server time or the Director 22 to identify the time during which the network information is unavailable.

In addition, the data synchronizing service 28 works with the data recovery service 30 to synchronize missing network traffic information, when made available, with the information already collected. Network traffic information may be unavailable because of system or network problems. In one example, the Appliances 14, 18 may fail to provide the Director 22 with the notification message. Consequently, the Director 22 does not fetch the network traffic information from the Appliances 14, 18. In another example, the Director 22 has received the notifications but is unable to communicate with the Appliances 14, 18 due to a network problem.

In the event a failure occurs elsewhere other than the Director 22, the data recovery service 30 is configured to buffer the network traffic information from other appliances. The data recovery service 30 may retrieve the network traffic information from the buffer and submit the information to the data synchronizing service 28 when the missing network traffic information is made available.

In another embodiment, the data recovery service 30 may include a timeout wait for the Appliance that has failed. If the Appliance does not recover prior to the timeout period, the data recovery service 30 may further mark the network traffic information at the buffer as incomplete. The incomplete network traffic information may be further aggregated by the aggregator 32 or be disregarded. In general, the incomplete network traffic information is handled according to the needs of the network operator 36. In addition, the data recovery service 30 may mark the failed Appliance as unavailable and drop the failed Appliance from further consideration. That is, the Director 22 stops collecting and consolidating network traffic information from the failed Appliance. When the failed Appliance has recovered, the Appliance may send a notification to the Director 22, thereby enabling the Director 22 to resume the collecting and consolidating network traffic information from that Appliance.

In another embodiment of the present invention, if the Director 22 becomes unavailable to collect the network traffic information, the data recovery service 30 is configured to backfill the network traffic information that has not been collected when the Director becomes available.

After the network traffic information from various Appliances has been synchronized, the data synchronizing service 28 provides the aggregator 32 with the synchronized network traffic information for further consolidation. The aggregator 32 may perform the aggregation immediately or at a later time in accordance with desired/needed system performance.

Database 34 may be any convenient form of database for storing the network traffic information intended for use by the Director 22. The precise form of database is not critical to the present invention, but may be a relational database or other form of conventional database.

Figure 2:
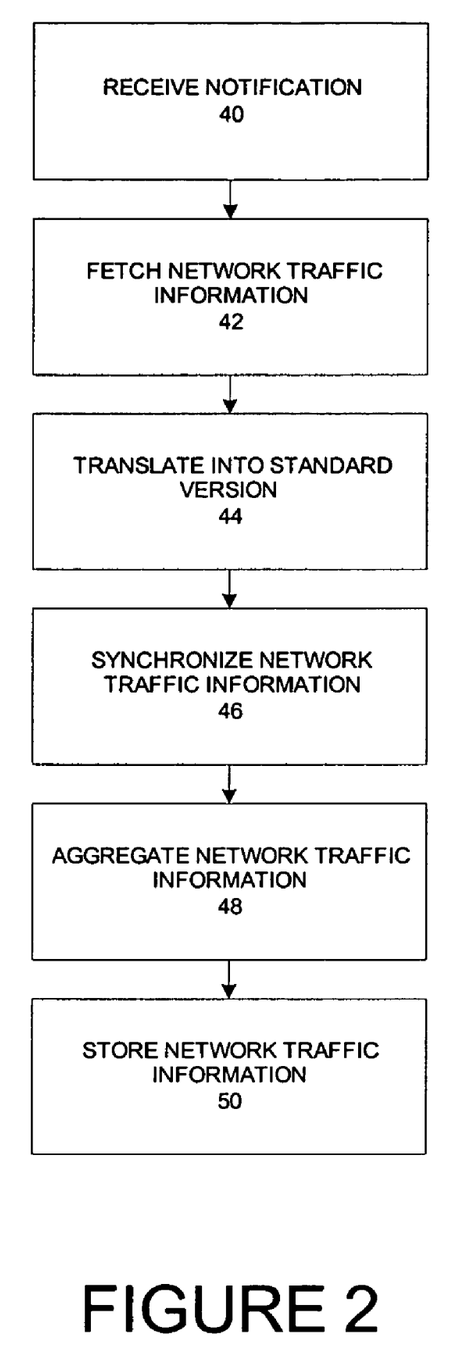
FIG. 2 is a flow diagram illustrating a process for collecting network data in accordance with an embodiment of the present invention.

With the above in mind, FIG. 2 illustrates the processes for the Director 22 to collect network traffic data from an Appliance, for example Appliance 14. The process begins at step 40 when the Director 22 receives an indication from Appliance 14 that the network traffic information of network 16 is available for collection. In response to the Appliance-initiated notification, the Director 22 fetches the network traffic information from Appliance 14 (step 42). It is to be noted that the Director 22 may fetch the network traffic information from the Appliance 14 immediately after receiving the notification or at a later time. For instance, the Director 22 may prefer to fetch the network traffic information from Appliance 14 during an off-peak period when the network is less utilized. In one embodiment of the present invention, the fetching of the network traffic information may be based on the performance metrics that include average delay from Appliances 14, 18 to the Director 22, loads on the Appliances 14, 18 or the Director 22, reliability of a path from the Appliances to the Director 22 and available bandwidth of the path. In addition, the Director 22 may employ multithreaded daemons which allow simultaneous collection of network traffic data from multiple Appliances.

After the Director 22 has successfully fetched the network traffic information from the Appliances, the Director 22 formats the network traffic information according to a normalized or unified data version (step 44). The formatted network traffic information is then synchronized (step 46) before it is aggregated (step 48) and stored in the database 34 (step 50)

Figure 3:
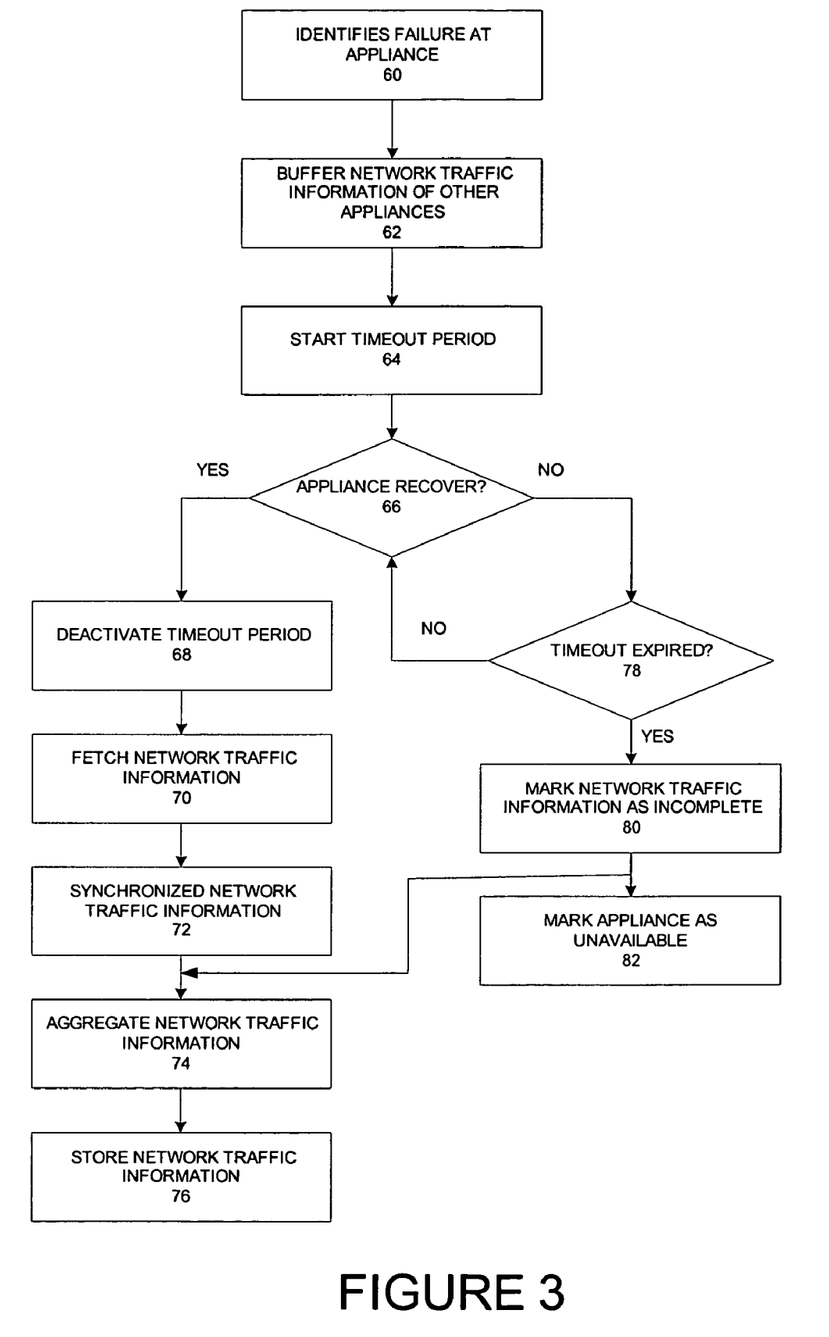
FIG. 3 is a flow diagram illustrating a process for synchronizing network data in accordance with an embodiment of the present invention.

Turning to FIG. 3, the flowchart illustrates a data recovery process performed by the Director 22. At step 60, the Director 22 identifies that an Appliance has failed. An Appliance may be deemed to have failed when the Director 22 does not receive an indication that the network traffic information is ready for collection from the Appliance in a time interval. In another case, the Director 22 may have successfully received the indication from the Appliance, but was unable to actually fetch the network traffic information from the Appliance.

After the Director 22 identifies that an Appliance has failed, the Director 22 buffers the network traffic information of other available Appliances (step 62). In this example, the Director 22 starts a timeout period for the Appliance 14 (step 64). The Director 22 may subsequently stop collecting and consolidating network traffic information from Appliance 14 if the Appliance 14 does not recover prior to the timeout period. Therefore, even if the Appliance 14 is unavailable for an extended period of time, the Director 22 is able to work on the network traffic information received from other Appliances.

After the Director 22 starts monitoring the timeout period, the Director 22 continues to check to see whether or not the Appliance 14 has recovered (step 66). In one example, the Director 22 may verify whether a notification message has been received from the Appliance 14. In another example, the Director 22 may periodically poll the Appliance 14 for a response.

If the Appliance 14 has recovered, the Director 22 deactivates the timeout period (step 68) and proceeds to fetch the network traffic information from Appliance 14 (step 70). Next, the Director 22 performs a data recovery operation whereby the network traffic information of Appliance 14 is further synchronized with the network traffic information of other Appliances which are stored in the buffer (step 72). The Director 22 aggregates the network traffic information (step 74) and stores the result of the consolidated network traffic information (step 76).

However, in the event that the timeout period expires (step 78) before the Appliance 14 recovers, the Director 22 marks the network traffic information that is stored in the buffer as incomplete (step 80). The Director 22 may proceed to aggregate the incomplete network traffic information, or alternatively, the Director 22 may store the incomplete network traffic information and only aggregate the information when Appliance 14 provides the missing network traffic information (this option is not shown in the illustration). The Director 22 may take such an approach if the Director 22 is confident that the Appliance 14 will recover in a reasonable period of time.

As shown, where the Director 22 proceeds to aggregate the incomplete information, the Director 22 marks the Appliance 14 as unavailable and removes the Appliance 14 from the list of Appliances (step 82). Therefore, at the next time interval for receiving notifications or fetching information from the Appliances, the Director 22 omits Appliance 14. This prevents the Director 22 from continually encountering problems with the Appliance 14, which is unavailable.

Figure 4A:
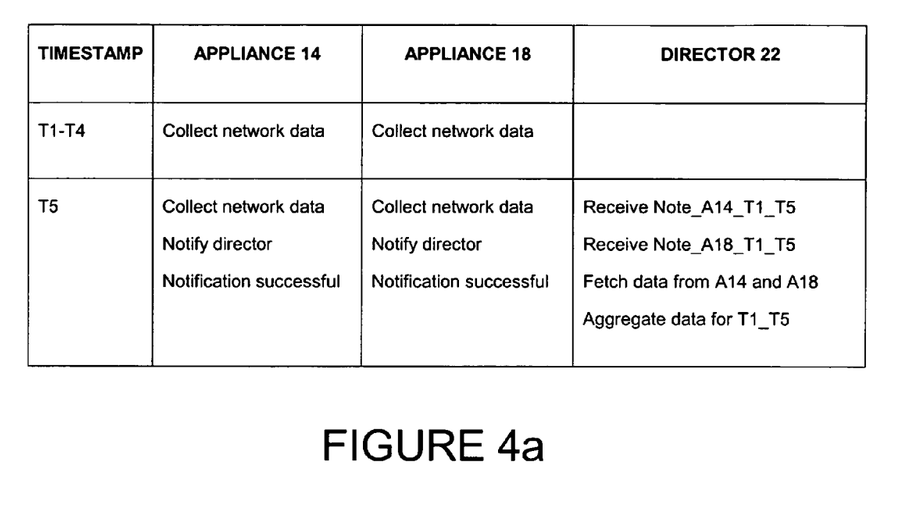
FIGS. 4a-4d are tables illustrating the activities of network monitoring devices in accordance with an embodiment of the present invention.

FIG. 4a illustrates the activities which occur between the Director 22 and the Appliances 14, 18 in a normal data collection process. At timestamps T1-T4, Appliances 14, 18 collect network traffic information from the networks 16 and 20 respectively. At timestamp 5, the Appliances 14, 18 notify the Director 22 that the network traffic information is available for collection. The notification process is successful when the Director 22 receives the notifications, Note_A14_T1_T5 and Note_A18_T1_T5. The Director 22 fetches the network traffic information from Appliances 14, 18, and aggregates the network traffic information. In this example, the Appliances 14, 18 are configured to send a notification to the Director 22 at a same timestamp, T5. However, the Appliances 14, 18 may notify the Director 22 autonomously at different timestamps. The Director 22 is designed to have the capability to synchronize the network traffic information submitted by the Appliances 14, 18 regardless of when the notification is received.

Figure 4B:
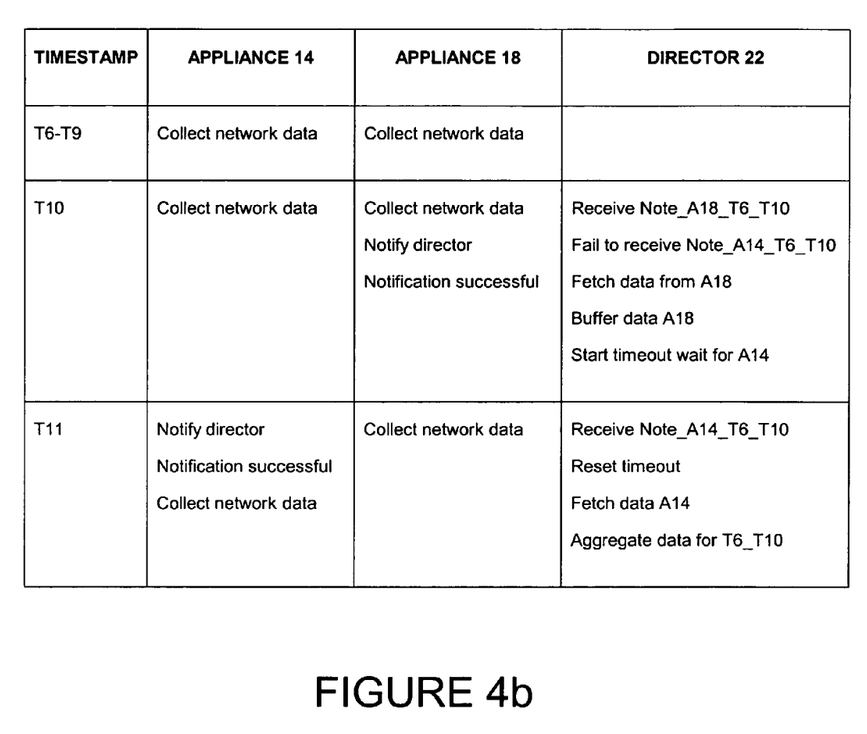

In FIG. 4b, Appliances 14, 18 each are configured to send the Director 22 a notification at timestamp T10. The Director 22 receives the notification, Note_A18_T6_T10, from the Appliance 18. However, the Director 22 fails to receive the notification from Appliance 14. The Director 22 proceeds to fetch the network traffic information from Appliance 18 and buffers the information. In addition, the Director 22 activates a timeout wait for Appliance 14. At timestamp T11, the Director 22 receives the notification, Note_A14_T6_T10, from the Appliance 14. As the notification is received before the timeout period expires, the Director 22 deactivates the timeout wait for Appliance 14, fetches the network traffic information from Appliance 14, and aggregates the network traffic information for the time period T6-T10.

Figure 4C:
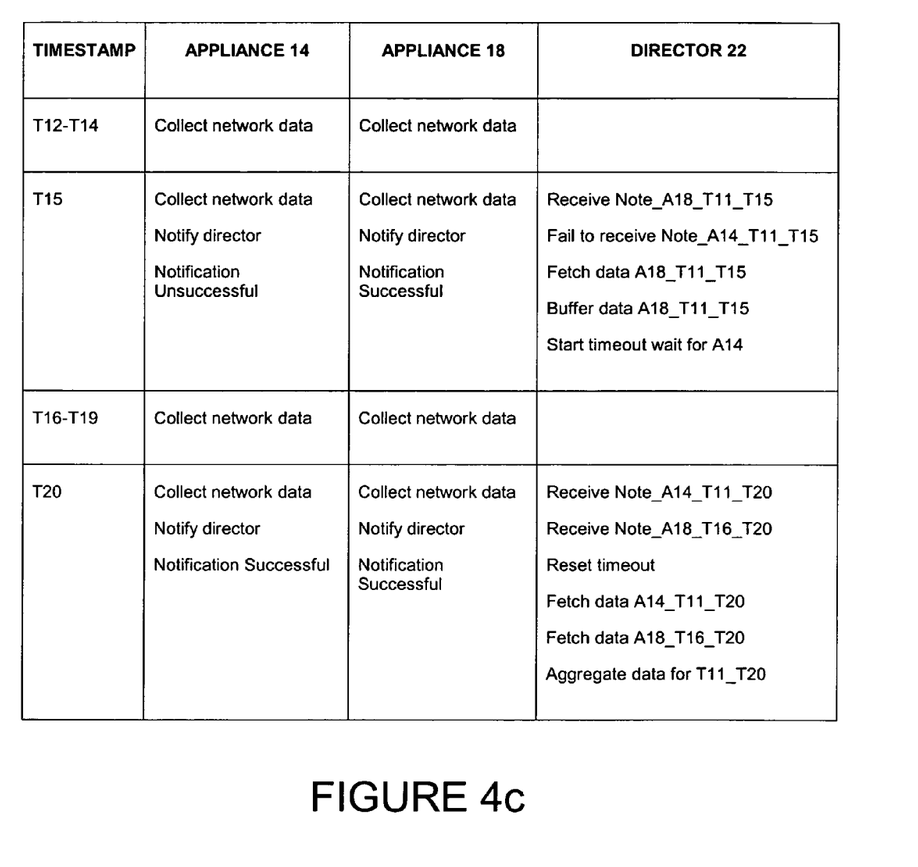

FIG. 4c illustrates another event similar to that shown in FIG. 4b wherein the notification from Appliance 14 is delayed. At timestamp T15, the Appliances 14, 18, each sends a notification to the Director 22. However, the notification from Appliance 14 fails to reach the Director 22 because, for example, the network path between Appliance 14 and Director 22 is temporarily unavailable. The Director 22 proceeds to fetch network traffic information from Appliance 18 and buffer the information. In addition, the Director 22 starts the timeout wait for the Appliance 14. Appliances 14, 18 continue to collect network traffic information during the time period T16-T19. At the next time interval, timestamp T20, Appliances 14, 18 send a notification to the Director 22. In this case, the Appliance 14 successfully notifies the Director that the network information for time period T11-T20 is available. Therefore, the Director 22 is informed that the missing information from Appliance 14 for time period T11-T15 is now available. The Director 22 deactivates the timeout wait for the Appliance 14. The Director 22 fetches the network traffic information from the Appliances 14, 18, synchronizes and aggregates the network traffic information.

Figure 4D:
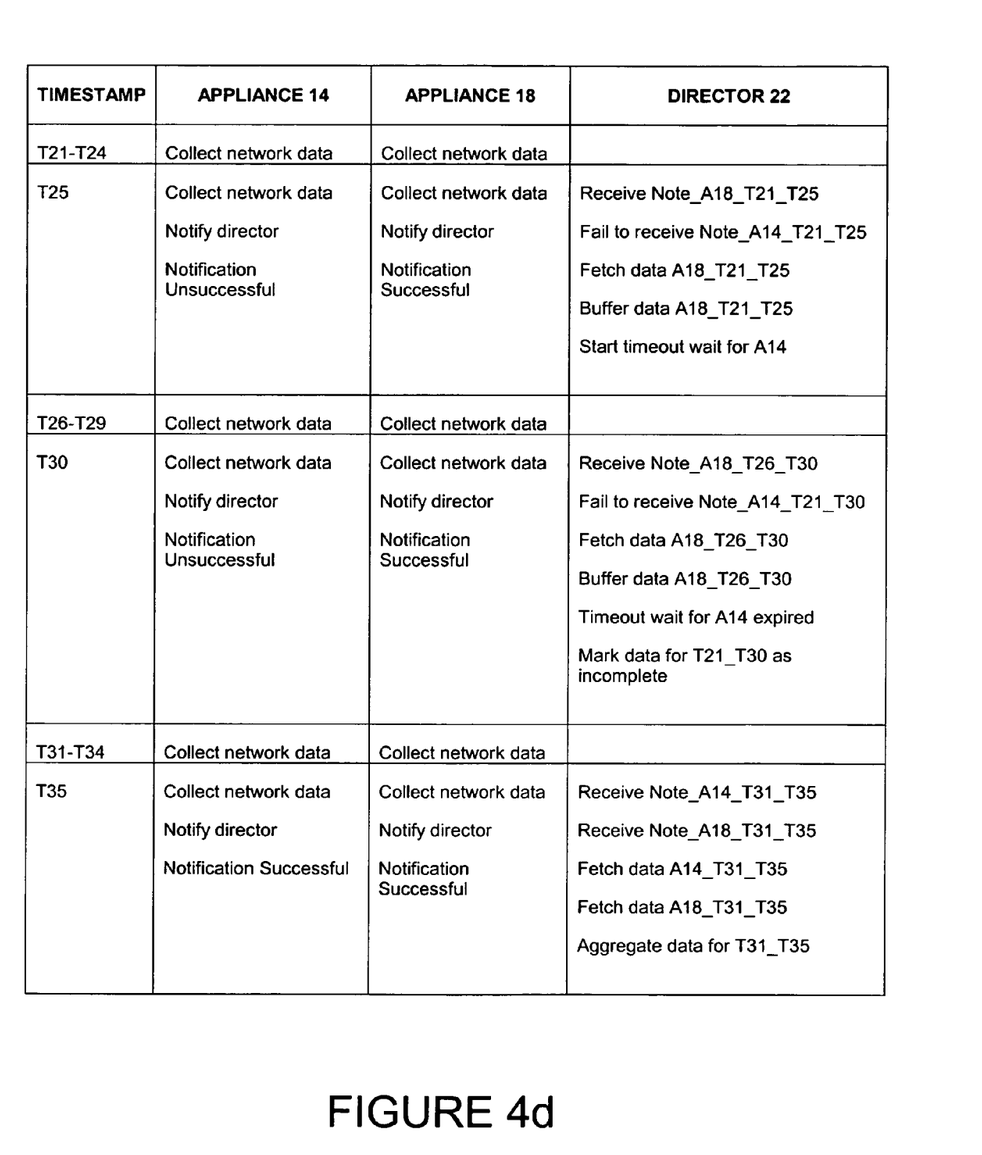

In FIG. 4d, the Appliances 14, 18 each send a notification to the Director 22 at timestamp T25. However, the Director 22 fails to receive the notification, Note_A14_T21_T25, from Appliance 14. As in previous cases, the Director 22 fetches the network traffic information from Appliance 18 and stores the information in a buffer. In addition, the timeout wait for Appliance 14 is activated. At the next timestamp T30, the Appliances 14, 18 send the notification to the Director 22. However, the Director 22 only successfully receives the notification from Appliance 18. The Director 22 fetches from the Appliance 18 the network traffic information for the time period T26-T30 and stores the information at the buffer. The buffer now contains network traffic information submitted by Appliance 18 for the time period T21-T30. At timestamp T30, the timeout wait for Appliance 14 expires. Consequently, the Director 22 proceeds to mark the traffic information stored at the buffer as incomplete.

However, at the next timestamp, T35, Appliances 14, 18 each successfully notify the Director 22 that network traffic information is available. In particular, the Appliance 14 notifies the Director 22 that the network traffic information for time period T31-T35 is available. The Director 22 fetches the network traffic information from both Appliances 14, 18 and aggregates the information for T31-T35.

Note that the notification from the Appliance 14 is not for the missing network traffic information of time period T21-T30. If the notification is indeed for T21-T35, the Director 22 may fetch the traffic information for T21-T35 from Appliance 14 and synchronize it with the traffic information of Appliance 18 including that to be fetched (for T31-T35) and that at the buffer (T21-T30).

Although not illustrated in FIG. 4, at timestamp T30, when the timeout period for Appliance 14 has expired, the Director 22 may mark Appliance 14 as unavailable. This in turn will stop the Director 22 from expecting a notification from Appliance 14 in the next time interval. The Director 22 may proceed to aggregate the network traffic information from other Appliances and present the information as completed. The Director 22 may resume monitoring the Appliance 14 only when the Appliance 14 successfully notifies the Director.

Thus, a method and a system for collecting network data from a distributed system of monitoring devices have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for execution at a central monitoring device, comprising:
    fetchling network traffic information from one or more remote monitoring devices in a network;
    synchronizing the network traffic information collected from the remote monitoring devices;
    identifying available and unavailable network traffic information, based on an absence of expected reporting;
    storing available network traffic information in a buffer;
    starting a timeout period to await receipt of as yet unavailable network traffic information for each corresponding unavailable remote monitoring device;
    ceasing collection of network traffic information from each unavailable remote monitoring device after expiration of each corresponding timeout period;
    resuming collection of network traffic information from a previously unavailable one of the remote monitoring devices in response to receipt of a notification from the previously unavailable remote monitoring device indicating that some or all of the previously unavailable network traffic information is available; and
    consolidating the network traffic information to provide information regarding the overall network performance.

2. The method of claim 1, including receiving a notification provided by the one or more remote monitoring devices that the network traffic information is available for fetching.

3. The method of claim 1, wherein the network traffic information is associated with a timestamp indicating a time period at which the network traffic information was collected by the remote monitoring devices.

4. The method of claim 3, wherein the synchronizing includes comparing the timestamp of the network traffic information with a system time provided by at least one of a system clock or a network time protocol server to produce a system timestamp of the network traffic information.

5. The method of claim 4, wherein the unavailable network traffic information is identified if the system timestamp of the network traffic information cannot be located when compared to the system time within an expected reporting interval.

6. The method of claim 1, including fetching the previously unavailable network traffic information and synchronizing the previously unavailable network traffic information with the available network traffic information in the buffer.

7. The method of claim 1, including marking network traffic information stored in the buffer as incomplete.

8. The method of claim 1, wherein fetching the network traffic information is based on one or more performance metrics, the performance metrics including one or more of: average delay from the remote monitoring devices to the central monitoring device, loads on the remote monitoring devices or the central monitoring device, and reliability of a path from the remote monitoring devices to the central monitoring device and available bandwidth of the path.

9. The method of claim 1, including resuming collection of network traffic information from a previously unavailable one of the remote monitoring devices in response to receipt of a notification from the previously unavailable remote monitoring device before the expiration of the corresponding timeout period, indicating that some or all of the previously unavailable network traffic information is available, and terminating the corresponding timeout period.

10. The method of claim 9, including fetching the previously unavailable network traffic information and synchronizing the previously unavailable network traffic information with the available network traffic information in the buffer.

11. A distributed network monitoring system, comprising a central monitoring device that is configured to:
    fetch network traffic information from one or more remote monitoring devices,
    synchronize and consolidate the network traffic information to provide information regarding the overall network performance,
    identify available and unavailable network traffic information based on an expectation of reporting,
    store the available network traffic information in a buffer,
    start a timeout period for each remote monitoring device associated with the unavailable network traffic information,
    cease collecting network traffic information from each of the remote monitoring devices with unavailable network traffic information upon expiration of an associated timeout period, and
    resume collecting network traffic information from any of the remote monitoring devices with previously unavailable network traffic information in response to receipt of notification that some or all of the previously unavailable network traffic information is now available.

12. The distributed network monitoring system of claim 11, wherein the central monitoring device is configured to fetch the network traffic information from one or more remote monitoring devices in response to receiving a notification from the remote monitoring devices that the network traffic information is available.

13. The distributed network monitoring system of claim 12, wherein at least one of the remote monitoring devices is configured to provide its associated notification according to a performance metrics, the performance metrics including one or more of: average delay from the remote monitoring devices to the central monitoring device, loads on the remote monitoring devices or the central monitoring device, and reliability of a path from the remote monitoring devices to the central monitoring device and available bandwidth of the path.

14. The distributed network monitoring system of claim 11, wherein the network traffic information is associated with a timestamp indicating one or more time periods at which the network traffic information was collected by the remote monitoring devices.

15. The distributed network monitoring system of claim 14, wherein the central monitoring device is configured to synchronize the network traffic information by comparing the timestamps of the network traffic information with a system time provided by at least one or more of a system clock or a network time protocol server to provide a system timestamp of the network traffic information.

16. The distributed network monitoring system of claim 15, wherein the network traffic information is identified as unavailable if one or more of the system timestamps of the network traffic information cannot be located when compared to the system time associated with an expected reporting interval.

17. The distributed network monitoring system of claim 11, wherein the central monitoring device is configured to fetch the previously unavailable network traffic information and to synchronize the previously unavailable network traffic information with the network traffic information stored in the buffer.

18. The distributed network monitoring system of claim 11, wherein the central monitoring device is configured to mark network traffic information stored in the buffer as incomplete.

19. The distributed network monitoring system of claim 11, wherein the central monitoring device is configured to the fetch the network traffic information based on one or more performance metrics, the performance metrics including one or more of: average delay from the remote monitoring devices to the central monitoring device, loads on the remote monitoring devices or the central monitoring device, and reliability of a path from the remote monitoring devices to the central monitoring device and available bandwidth of the path.

20. The distributed network monitoring system of claim 11, wherein the central monitoring device is configured to resume collecting network traffic information from any of the remote monitoring devices with previously unavailable network traffic information in response to receipt, before the expiration of the timeout period, of notification that some or all of the previously unavailable network traffic information is now available, and terminating the timeout period.

21. The distributed network monitoring system of claim 20, wherein the central monitoring device is configured to fetch the previously unavailable network traffic information and to synchronize the previously unavailable network traffic information with the network traffic information stored in the buffer.

* * * * *